(12) United States Patent
Bienek et al.

(10) Patent No.: US 10,875,555 B2
(45) Date of Patent: Dec. 29, 2020

(54) ENERGY SUPPLY DEVICE FOR A SWITCH MACHINE AND METHOD FOR SUPPLYING ENERGY TO AND CONTROLLING A SWITCH MACHINE

(71) Applicant: SIEMENS MOBILITY GMBH, Munich (DE)

(72) Inventors: Frank Bienek, Wolfenbuettel (DE); Philip Fosu Okyere, Braunschweig (DE)

(73) Assignee: Siemens Mobility GmbH, Munich (DE)

( * ) Notice: Subject to any disclaimer, the term of this patent is extended or adjusted under 35 U.S.C. 154(b) by 313 days.

(21) Appl. No.: 15/758,941

(22) PCT Filed: Sep. 1, 2016

(86) PCT No.: PCT/EP2016/070563
§ 371 (c)(1),
(2) Date: Mar. 9, 2018

(87) PCT Pub. No.: WO2017/045927
PCT Pub. Date: Mar. 23, 2017

(65) Prior Publication Data
US 2019/0039632 A1    Feb. 7, 2019

(30) Foreign Application Priority Data
Sep. 18, 2015   (DE) .................. 10 2015 217 952

(51) Int. Cl.
*B61L 7/08*    (2006.01)
*B61L 5/10*    (2006.01)
(Continued)

(52) U.S. Cl.
CPC ............... *B61L 5/107* (2013.01); *B61L 3/125* (2013.01); *B61L 7/08* (2013.01); *B61L 11/083* (2013.01);
(Continued)

(58) Field of Classification Search
CPC .. B61L 7/08; B61L 5/102; B61L 5/107; B61L 5/06; B61L 3/125; B61L 11/083; H02M 7/44; H02M 7/48; H02M 2001/007
See application file for complete search history.

(56) References Cited

U.S. PATENT DOCUMENTS 2,651,714 A * 9/1953  Poole ...................... B61L 5/065
                                                        246/253
3,553,449 A * 1/1971  Hathaway ................. B61L 7/08
                                                        246/3
(Continued)

FOREIGN PATENT DOCUMENTS

CN     201354082 Y     12/2009
CN     203637857 U     6/2014
(Continued)

*Primary Examiner* — Zachary L Kuhfuss
(74) *Attorney, Agent, or Firm* — Laurence Greenberg; Werner Stemer; Ralph Locher

(57) ABSTRACT

An energy supply device for a switch machine is configured to be fed a direct voltage and to provide an alternating voltage suitable for the switch machine. Accordingly, in order to be able to produce a railway switch more economically, the energy supply device is configured to control the switch machine.

13 Claims, 2 Drawing Sheets

(51) Int. Cl.
*B61L 11/08* (2006.01)
*B61L 3/12* (2006.01)
*H02M 1/00* (2006.01)
*H02M 7/48* (2007.01)
*H02M 7/44* (2006.01)

(52) U.S. Cl.
CPC ................ *H02M 7/44* (2013.01); *H02M 7/48* (2013.01); *H02M 2001/007* (2013.01)

(56) References Cited

U.S. PATENT DOCUMENTS

| | | | | |
|---|---|---|---|---|
| 4,330,717 A * | 5/1982 | Coleman | ................ | H02M 7/48 |
| | | | | 307/46 |
| 4,634,952 A * | 1/1987 | Yoshino | .............. | H02P 23/0077 |
| | | | | 318/803 |
| 5,504,405 A * | 4/1996 | Hager | ................ | B61L 5/062 |
| | | | | 318/400.01 |
| 5,547,151 A | 8/1996 | Giras et al. | | |
| 5,790,391 A * | 8/1998 | Stich | ................ | H02J 9/062 |
| | | | | 307/64 |
| 5,806,809 A * | 9/1998 | Danner | ................ | B61L 5/107 |
| | | | | 246/220 |
| 6,484,974 B1 * | 11/2002 | Franke | ................ | B61L 5/107 |
| | | | | 246/220 |
| 7,282,816 B2 * | 10/2007 | Ridgeway | ................ | B61L 5/06 |
| | | | | 246/220 |
| 7,577,502 B1 * | 8/2009 | Henry | ................ | B61L 5/102 |
| | | | | 246/218 |
| 7,753,318 B2 * | 7/2010 | Wagner | ................ | B61L 5/107 |
| | | | | 246/220 |
| 8,319,463 B2 * | 11/2012 | Sasaki | ................ | H02M 7/48 |
| | | | | 318/400.3 |
| 9,090,269 B2 * | 7/2015 | Vogt | ................ | B61L 5/10 |
| 9,889,867 B2 * | 2/2018 | Johnson | ................ | B61L 5/06 |
| 10,027,142 B2 * | 7/2018 | Birrer | ................ | B61L 29/00 |
| 2011/0049308 A1 * | 3/2011 | Beaman | ................ | B61L 5/04 |
| | | | | 246/258 |
| 2016/0172881 A1 * | 6/2016 | Birrer | ................ | B61L 1/00 |
| | | | | 246/218 |
| 2019/0039632 A1 * | 2/2019 | Bienek | ................ | B61L 11/083 |
| 2019/0061792 A1 * | 2/2019 | Nagrodsky | ................ | B61L 23/04 |
| 2019/0291756 A1 * | 9/2019 | Okyere | ................ | B61L 23/00 |

FOREIGN PATENT DOCUMENTS

| | | |
|---|---|---|
| DE | 3029851 A1 | 2/1982 |
| DE | 4038339 A1 | 6/1992 |
| DE | 19600186 A1 | 7/1996 |
| DE | 19606894 A1 | 8/1997 |
| DE | 102006026773 A1 | 12/2007 |
| DE | 102013225815 A1 | 6/2015 |
| EP | 1814766 A1 | 8/2007 |
| WO | 2006047971 A1 | 5/2006 |

* cited by examiner

ENERGY SUPPLY DEVICE FOR A SWITCH MACHINE AND METHOD FOR SUPPLYING ENERGY TO AND CONTROLLING A SWITCH MACHINE

BACKGROUND OF THE INVENTION

Field of the Invention

The invention relates to an energy supply device for a switch machine, which is configured to be fed with a DC voltage and to provide an AC voltage suitable for the switch machine.

The invention further relates to a method for supplying energy to and controlling a switch machine for a railway switch, in which a DC voltage is provided and the DC voltage is converted by an energy supply device into an AC voltage.

Energy supply devices and methods of the above-stated type are known from the prior art and are used for the switches of a railway system. Known energy supply devices provide a three-phase AC voltage at their outputs, this being necessary for a conventional switch machine of a switch. Known energy supply devices are fed with a DC voltage, which is provided for example by an energy bus. The known switches are controlled by a switch machine controller, which is connected to the switch machine. These days switches and railway systems are generally under considerable cost pressure.

SUMMARY OF THE INVENTION

It is an object of the present invention to provide an energy supply device and a method for supplying energy to and controlling a switch machine by which the total costs of a railway switch can be reduced.

The energy supply device according to the invention achieves this object in that the energy supply device of the above-stated type is configured to control the switch machine.

The above-stated method achieves the object in that, according to the invention, the switch machine is controlled by the energy supply device.

The solution according to the invention dispenses at least in part with the switch machine controller or allows the tasks thereof to be taken over by the energy supply device. In this way, synergistic effects can be exploited, such that the total costs relating to a switch are reduced. The solution according to the invention is particularly suitable for a decentralized signal tower architecture of a railway system, in which the electricity required is provided by a, for example 750 V DC, energy bus along the route. In this case, the energy supply device according to the invention draws the required energy from the energy bus in location-dependent manner with regard to the associated switch and converts the existing DC voltage into the three-phase AC voltage conventionally required. As a result of the solution according to the invention, control tasks which have hitherto been undertaken by the switch machine controller independently of the energy supply device are performed by the energy supply device.

The solution according to the invention may be further developed by advantageous configurations described below.

For instance, the energy supply device may comprise at least one processing device, by which the AC voltage may be influenced. This processing device may for example be a digital signal processor, which, as one component, may take on both power supply tasks and switch machine controller tasks.

In addition, the energy supply device may have at least one inverter for converting the DC voltages into AC voltage. This has the advantage that the inverter is particularly readily usable for controlling the switch machine. In particular, the energy supply device may be configured to control the phase angle of the AC voltage. The direction of rotation of the switch machine may for example be simply controlled in this way. It is possible to dispense with and save on a separate circuit for direction reversal by special contacts.

To transfer further switch machine controller tasks to the energy supply device, the energy supply device may comprise at least one monitoring device, which is configured to detect and test the voltage and/or the current at an input and/or output. This monitoring device may likewise take the form, for example, of a digital signal processor. The monitoring device may for example perform input voltage detection and voltage and current measurement of the output three-phase AC voltage.

In one further development according to the invention, the energy supply device may comprise at least four contacts for connection with the switch machine. The advantage of this is that in this way the four-wire connection conventional for switch machines can be used.

In one advantageous configuration, the energy supply device may comprise at least one communication means, which is configured to receive advance information relating to activation of the switch machine. The advantage of this is that parts of the energy supply device, such as for example the inverter, may be turned off during periods when no switching operation is needed. This enables a considerable reduction in power loss or reactive power. The communication means may for example be configured to receive a datagram or a digital input, whereby the energy supply device may be activated prior to a necessary switching operation.

To achieve position monitoring of the switch by the energy supply device, said energy supply device may comprise at least one evaluating means, which is configured to evaluate position contacts of the switch machine.

In one advantageous configuration, the energy supply device may further comprise at least one circuit for preventing contact problems, which is configured for short-term provision of a higher current and/or a higher voltage. This "fritting" circuit has the advantage of ensuring reliable switching even after a long deactivation period and the presence of oxidation at the contact faces.

Furthermore, the above-mentioned evaluating means and/or the above-stated circuit for preventing contact problems may be arranged in a separate housing. The advantage of this is that these safety-relevant parts are configured separately from the power supply, which may be advantageous with regard to safety approval of a switch. This separate unit may be considered the only remnant of the hitherto conventional switch machine controller.

The invention further relates to a switch for a railway system with at least one switch machine and at least one energy supply device. To be able to manufacture the switch less expensively, provision is made according to the invention for the energy supply device to be configured according to one of the above-described embodiments.

In one advantageous further development of the method according to the invention, the switch machine may be activated by the energy supply device through the generation of AC voltage. The advantage of this is that separate motor actuation, for example by relays, is unnecessary. Switching on and off of the switch machine is assumed by the energy supply device.

Furthermore, to change a direction of movement of the switch machine, the phase angle of the AC voltage may be changed. The advantage of this is that this is achieved by the energy supply device and it is thus possible to dispense with corresponding hardware such as for example direction reversal switching contacts.

To reduce the reactive power, as already described above, activation of the switch machine may be pre-announced. This enables the inverter of the energy supply device to be temporarily turned off.

BRIEF DESCRIPTION OF THE SEVERAL VIEWS OF THE DRAWING

The invention is described below with reference to the exemplary embodiments of the invention illustrated in the appended drawings, in which.

DESCRIPTION OF THE INVETION

Figure 1:
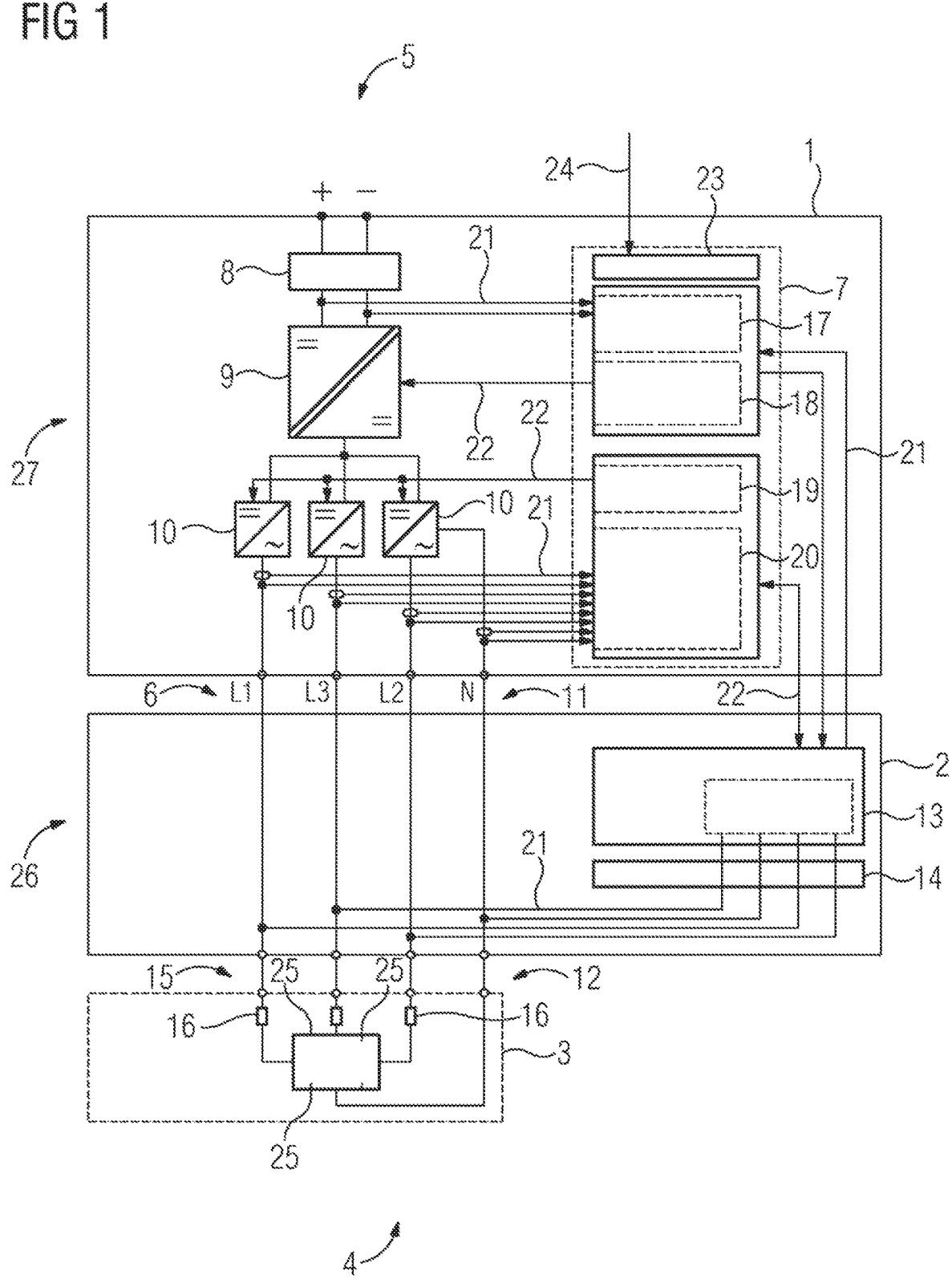
FIG. 1 is a schematic representation of a first exemplary embodiment of the energy supply device according to the invention.

FIG. 1 shows part of a switch 4 according to the invention of a railway system. The switch 4 comprises an exemplary embodiment of an energy supply device 1, a switch machine controller 2 and a switch machine 3.

In the embodiment in FIG. 1, the energy supply device 1 according to the invention comprises input contacts 5, output contacts 6, a processing device 7, an input filter 8, a DC-DC converter 9 and a three-phase inverter 10.

The input contacts 5 of the energy supply device 1 are configured to be fed with a DC voltage. In the exemplary embodiment of FIG. 1 the input contacts 5 are connected for example with a 750 V DC energy bus (not shown). The input contacts 5 are connected within the energy supply device 1 with the input filter 8, which is designed to filter the DC voltage supplied by the energy bus. The input filter 8 is further connected with the DC-DC converter 9. The DC-DC converter 9 converts the DC voltage supplied by the input filter 8 into a DC voltage isolated from the input voltage as a DC link voltage with a higher or lower voltage level, in order to provide the required constant DC voltage for the inverter 10. On the output side the DC-DC converter 9 is connected with the inverter 10. The inverter 10 is configured to convert the isolated DC voltage provided by the DC-DC converter 9 into a three-phase AC voltage required by the switch machine 3. The three-phase AC voltage L1, L2, L3 produced by the inverter 10 is provided, including neutral conductor N, at the four output contacts 6.

In the exemplary embodiment of FIG. 1, the switch machine controller 2 comprises input contacts 11, output contacts 12, an evaluating means 13 and a circuit 14 for preventing contact problems.

The switch machine 3 comprises input contacts 15, a switch machine motor 16 and position contacts 25.

To control the energy supply device 1 and the switch machine 3, the processing device 7 of the energy supply device 1 according to the invention comprises a detection unit 17, a motor control unit 18, a phase control unit 19 and a measuring unit 20.

The processing device 7 is connected via signal lines 21 to various points in the current path within the energy supply device 1, so as to be able to monitor the current or voltage at various points. In this way, the detection unit 17 may detect the input voltage, which is provided by the input filter 8 for the DC-DC converter 9, for production of the three-phase AC voltage. Furthermore, the processing device 7 is connected via control lines 22 with the DC-DC converter 9, the inverter 10 and the evaluating means 13 of the switch machine controller 2, to control the latter. In this way, for example, the motor control unit 18 may turn the three-phase AC voltage on and off at the output contacts 6 and thereby likewise turn the switch machine motor 16 on and off. This means that no additional circuit is needed in the switch machine controller 2, for example using relays or contactor contacts as in the prior art.

The phase control unit 19 may change the phase angle of the individual AC voltages LI, L2, L3 via the inverter 10, such that the direction of rotation of the switch machine motor 16 may be controlled by the processing device 7. The three AC output voltages LI, L2, L3 exhibit 120° phase angles relative to one another. Thus a change in the phase angle of two AC output voltages may result in a changeover of the direction of rotation of the switch machine motor 16. Additional relay contacts for reversing direction of rotation are thus not required.

The measuring unit 20 performs voltage and current measurement of the three-phase AC voltage provided at the output contacts 6. Voltage and current monitoring may thus be performed for the switch machine motor 16 by the energy supply device. Running current monitoring of phase L2 and of the neutral conductor N is made available directly from the open- and closed-loop control circuits of the respective output voltage of the inverters 10 and likewise monitored by the measuring unit 20.

The detection unit 17 and the measuring unit 20 are in each case embodiments of a monitoring device described above.

The processing device 7 of the exemplary embodiment of the energy supply device 1 according to the invention further comprises a communication means 23, which is configured to receive advance information 24 relating to activation of the switch machine 3. The communication means 23 is configured as a receiver, which receives the advance information 24 in the form of a datagram or a digital input. Communication may proceed wirelessly or in cable-based manner or in other ways. The provision of advance information 24 makes it possible, for example, to turn off the inverter 10 for periods when no switching operation is necessary. A necessary switching operation is announced by advance information 24 and leads to activation of the inverter 10 by the processing device 7. In this way, the power loss or reactive power of the energy supply device 1 may be advantageously reduced.

Furthermore, through smart closed-loop control of the voltage amplitudes at the output of the inverters 10 and using voltage and current monitoring of the measuring unit 20, the processing device 7 may prevent high starting currents for the switch machine motor 16.

The energy supply device 1 according to the invention may lead to a cost reduction as a result of the economies relating to redundant circuit parts, in conjunction with a volume reduction as a result of a smaller number of components overall, relative to prior art energy supply devices. Because, for example, electromagnetic components, such as for example relays or contactors, are omitted, the energy supply device 1 achieves a higher availability.

The evaluating means 13 of the switch machine controller 2 in FIG. 1 is configured to evaluate the position contacts 25 of the switch machine 3. The position contacts 25 serve in switch position monitoring and are wired together with the feed lines for the motor windings of the switch machine motor 16. The position contacts 25 may therefore be tapped by the evaluating means 13 via the signal lines 21 and evaluated accordingly.

The circuit 14 for preventing contact problems is a "fritting" circuit. The fritting circuit succeeds in overcoming contact problems resulting from oxidized contacts by providing a short-term higher current or a higher voltage.

In the embodiment of FIG. 1, the evaluating means 13 and the circuit 14 are arranged in a separate housing 26 from a housing 27 of the energy supply device 1. The advantage of this is that safety-relevant position detection of the switch machine 3 by the evaluating means 13 is isolated from the parts of the energy supply device 1, which has advantages for railway authority approval of the switch.

Figure 2:
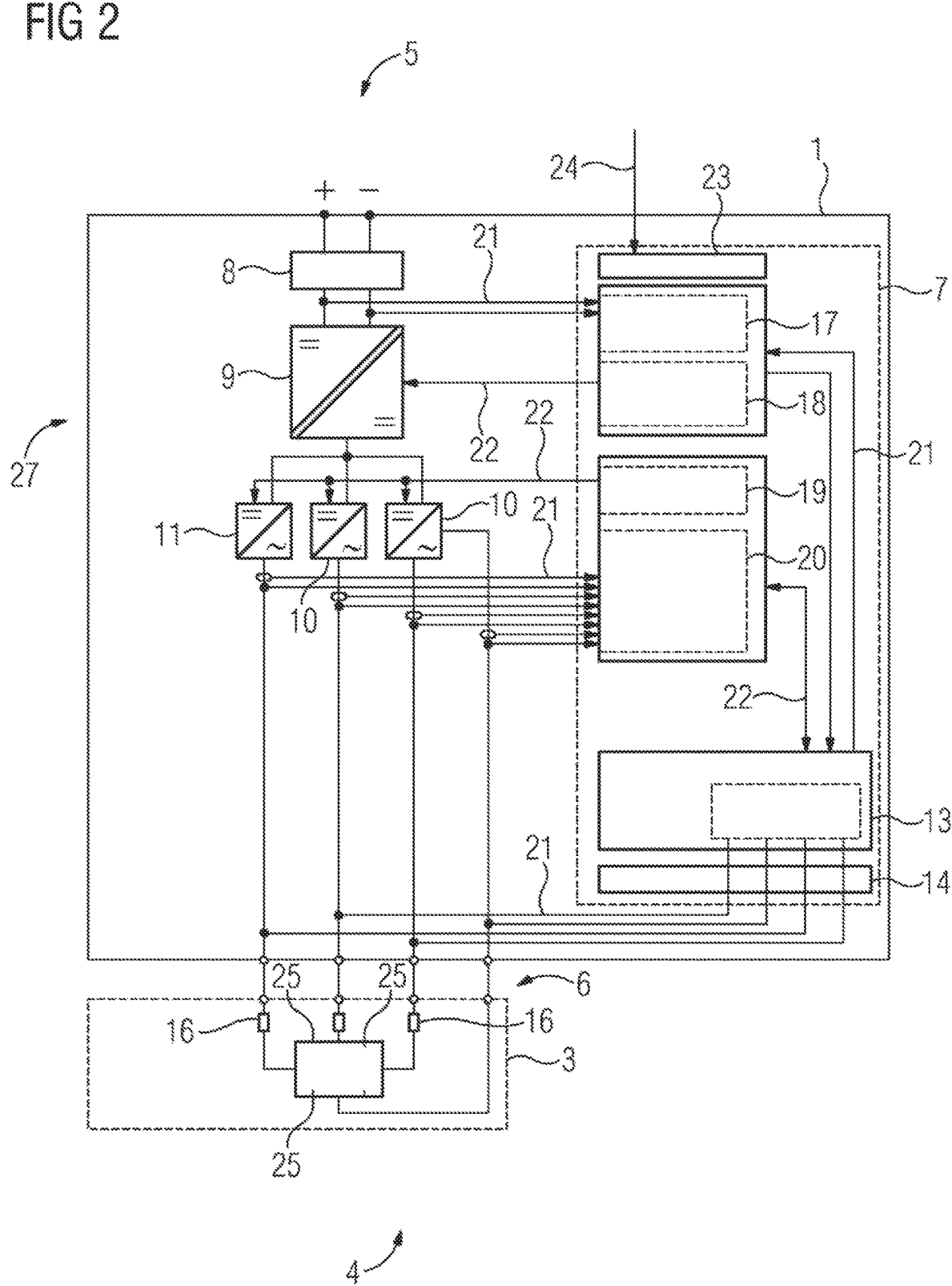
FIG. 2 is a schematic representation of a further embodiment of the energy supply device according to the invention.

The exemplary embodiment of the energy supply device 1 according to the invention shown in FIG. 2 is described below. For simplicity's sake, only the differences relative to the embodiment of FIG. 1 are looked at.

In contrast to the embodiment in FIG. 1, the evaluating means 13 and the circuit 14 for preventing contact problems are part of the processing device 7 of the energy supply device 1. All the parts are therefore arranged in a common housing 27. The advantage of this is that a separate switch machine controller may be wholly dispensed with and all the control aspects performed by the energy supply device 1.

The invention claimed is:

1. An energy supply device configured to supply energy to, and to control, a switch machine, the energy supply device comprising:
   an inverter configured to receive a DC voltage and to convert the received DC voltage to an AC voltage to supply energy to, and to control the switch machine, the switch machine controlled by adjusting a phase angle of said AC voltage to control a direction of rotation of the switch machine.

2. The energy supply device according to claim 1, wherein said energy supply device includes at least one processing device configured to control said inverter in converting the DC voltage to the AC voltage.

3. The energy supply device according to claim 2, wherein said at least one processing device is configured to control said inverter to change the phase angle of the AC voltage.

4. The energy supply device according to claim 1, further comprising at least one monitoring device, said at least one monitoring device configured to measure the DC voltage and/or the AC voltage and/or to measure a current at an input and/or an output of said inverter.

5. The energy supply device according to claim 1, wherein said energy supply device includes further inverters configured to receive the DC voltage and to convert the received DC voltage to further AC voltages for supplying energy to, and controlling, the switch machine; and at least four contacts for connecting the inverters with the switch machine.

6. The energy supply device according to claim 1, further comprising at least one communication apparatus which is configured to receive advance information relating to activation of the switch machine.

7. The energy supply device according to claim 1, further comprising at least one evaluator configured to evaluate position contacts of the switch machine.

8. The energy supply device according to claim 7, further comprising at least one circuit for preventing contact problems on said position contacts, said at least one circuit is configured for short-term provision of a higher current and/or a higher voltage to said position contacts.

9. The energy supply device according to claim 8, wherein at least one of said evaluator or said circuit is disposed in a separate housing.

10. A switch for a railway system, the switch comprising:
    at least one switch machine; and
    at least one energy supply device according to claim 1, configured to be fed with a DC voltage and to provide an AC voltage, to supply energy to, and to control, said switch machine.

11. A method for supplying energy to and controlling a switch machine of a railway switch, which comprises the steps of:
    receiving, at an inverter of an energy supply device, a DC voltage;
    converting, at the inverter, the DC voltage into an AC voltage; and
    using the AC voltage to supply enemy to, and to control, the switch machine, the switch machine being controlled by adjusting a phase angle of said AC voltage to control a direction of movement of the switch machine.

12. The method according to claim 11, activating the switch machine using the AC voltage.

13. The method according to claim 11, which further comprises receiving information on an activation of the switch machine.

* * * * *